United States Patent
Aflaki Beni

(10) Patent No.: US 10,482,586 B2
(45) Date of Patent: Nov. 19, 2019

(54) FILTERING DEPTH MAP IMAGE

(71) Applicant: Nokia Technologies Oy, Espoo (FI)

(72) Inventor: Payman Aflaki Beni, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 51 days.

(21) Appl. No.: 15/571,931

(22) PCT Filed: May 18, 2015

(86) PCT No.: PCT/FI2015/050343
§ 371 (c)(1),
(2) Date: Nov. 6, 2017

(87) PCT Pub. No.: WO2016/185079
PCT Pub. Date: Nov. 24, 2016

(65) Prior Publication Data
US 2018/0137610 A1    May 17, 2018

(51) Int. Cl.
*G06K 9/40*    (2006.01)
*G06T 5/20*    (2006.01)
(Continued)

(52) U.S. Cl.
CPC ............... *G06T 5/20* (2013.01); *G06T 5/001* (2013.01); *G06T 7/11* (2017.01); *H04N 13/128* (2018.05);
(Continued)

(58) Field of Classification Search
CPC . G06T 2207/10028; G06T 2207/20012; G06T 2207/20021; G06T 2207/20028;
(Continued)

(56) References Cited

U.S. PATENT DOCUMENTS 9,030,469 B2 * 5/2015 Huang ................. G06T 7/0071
345/419
2013/0342644 A1 * 12/2013 Rusanovskyy ...... H04N 19/597
348/43
(Continued)

OTHER PUBLICATIONS

International Search Report and Written Opinion received for corresponding Patent Cooperation Treaty Application No. PCT/FI2015/050343, dated Feb. 19, 2016, 9 pages.
(Continued)

*Primary Examiner* — Matthew C Bella
*Assistant Examiner* — Ian L Lemieux
(74) *Attorney, Agent, or Firm* — Alston & Bird LLP

(57) ABSTRACT

There is inter alia a method comprising: partitioning a depth map image into at least one block; partitioning a texture image into at least one block, wherein the size and position of the at least one block of the texture image corresponds to the size and position of the at least one block of the depth image; determining a depth property value for the at least one block of the depth map image; determining a texture property value for the at least one block of the texture image; using the depth property value for the at least one block of the depth map image and the texture property value for the at least one block of the texture image to select a set of filter parameters from a look up table; and filtering the at least one block of the depth map image with a filter based on the selected set of filter parameters.

17 Claims, 6 Drawing Sheets

(51) Int. Cl.
*G06T 5/00* (2006.01)
*G06T 7/11* (2017.01)
*H04N 13/128* (2018.01)
*H04N 13/00* (2018.01)

(52) U.S. Cl.
CPC ............... *G06T 2207/10028* (2013.01); *G06T 2207/20012* (2013.01); *G06T 2207/20021* (2013.01); *G06T 2207/20028* (2013.01); *H04N 2013/0081* (2013.01)

(58) Field of Classification Search
CPC .. G06T 5/001; G06T 5/20; G06T 7/11; H04N 13/128; H04N 2013/0081
See application file for complete search history.

(56) References Cited

U.S. PATENT DOCUMENTS

| | | | |
|---|---|---|---|
| 2014/0184744 A1* | 7/2014 | Liu | H04N 19/597 348/43 |
| 2015/0015569 A1* | 1/2015 | Jung | G06T 15/005 345/419 |
| 2015/0049821 A1* | 2/2015 | Chen | H04N 19/176 375/240.24 |
| 2015/0071526 A1* | 3/2015 | Nguyen | G06T 5/10 382/154 |
| 2015/0139533 A1* | 5/2015 | Wu | G06K 9/00362 382/154 |
| 2015/0178970 A1* | 6/2015 | Pham | G06T 5/002 382/190 |
| 2015/0269736 A1* | 9/2015 | Hannuksela | H04N 13/161 345/419 |
| 2016/0048970 A1* | 2/2016 | Loghman | G06T 7/593 382/154 |
| 2016/0063715 A1* | 3/2016 | Wan | G06T 3/40 382/195 |
| 2016/0094829 A1* | 3/2016 | Georgiev | H04N 13/161 348/43 |
| 2017/0188002 A1* | 6/2017 | Chan | H04N 13/128 |

OTHER PUBLICATIONS

Frederic Garcia et al. "A new multi-lateral filter for real-time depth enhancement", Advanced Video and Signal-based surveillance (AVSS), 2011 8th IEEE International Conference ON, IEEE, Aug. 30, 2011, pp. 42-47.

Sergey Smirnov "Methods for depth-map filtering in view-plusdepth 3D video representation", Jan. 25, 2012, retrieved from Internet: URL:http://asp.eurasipjournals.com/content/pdf/1687-6180-2012-25.pdf [retrieved on Sep. 6, 2012] p. 9.

Aflaki Payman et al. "Joint depth and texture filtering targeting MVD compression", 2014 IEEE Visual Communications and Image Processing Conference, IEEE, Dec. 7, 2014, pp. 410-413.

Joachimiak Michal et al. "Complete processing chain for 3D video generation using Kinect sensor", 2013 International Conference on 3D Imaging, IEEE, Dec. 3, 2013, pp. 1-7.

Office Action for European Application No. 15728040.5 dated Aug. 29, 2018.

* cited by examiner

FILTERING DEPTH MAP IMAGE

RELATED APPLICATION

This application was originally filed as PCT Application No. PCT/FI2015/050343 filed May 18, 2015.

TECHNICAL FIELD

Various implementations relate generally to method, apparatus, and computer program product for filtering of media content.

BACKGROUND

Various electronic devices, for example, cameras, mobile phones, and other multimedia devices are widely used for capturing media content and post-capture processing of the media content. Some of these devices also facilitate availability of 3 dimensional (3D) video content post-capturing. Recent advances in the digital video coding have enabled adoption of 3D video content in personal communications such as capturing and sharing of personal 3D video content and/or the video content available online (e.g., internet resources). The 3D video content may be represented by a pair of 2D video signals. The pair of 2D video signals represents different views of the same scene such that the pair of 2D video signals gives a perception of depth associated with the scene. The 3D video content is becoming increasingly popular because of the real-life like experience gained by the user. However, the 3D video content is associated with a high bitrate, and the broadcast of 3D video content poses a challenge due to limited bandwidth capacity of the broadcasting infrastructures.

SUMMARY

There is provided according to various aspects of embodiments a method comprising partitioning a depth map image into at least one block; partitioning a texture image into at least one block, wherein the size and position of the at least one block of the texture image corresponds to the size and position of the at least one block of the depth image; determining a depth property value for the at least one block of the depth map image; determining a texture property value for the at least one block of the texture image; using the depth property value for the at least one block of the depth map image and the texture property value for the at least one block of the texture image to select a set of filter parameters from a look up table; and filtering the at least one block of the depth map image with a filter based on the selected set of filter parameters.

The look up table may comprise a first dimension of a plurality of intervals of the depth property value and a second dimension of a plurality of intervals of the texture property value, and each combination of interval of the plurality of intervals of the depth property value and interval of the plurality of intervals of the texture property value references a distinct set of filter parameters in the look up table.

The filter strength for filtering the at least one block of the depth map image may be determined by the selected set of filter parameters, and wherein each of the distinct sets of filter parameters in the look up table may have been tuned according to their respective interval of depth property value and respective interval of texture property value.

Each of the plurality of intervals of the depth property value spans a different range of depth property values, each of the plurality of intervals of the texture property value spans a different range of texture property values, and using the depth property value and texture property value to select a set of filter parameters from a look up table may comprise: determining an interval of the plurality of intervals of the depth property value with which the depth property value for the at least one block of the depth map image lies; determining an interval of the plurality of intervals of the texture property value with which the texture property value for the at least one block of the texture image lies; and selecting the set of filter parameters referenced by the determined interval of the plurality of intervals of the depth property value and the determined interval of the plurality of intervals of the texture property value.

The depth property value may be value returned from a function of pixel depth values of the at least one block of the depth map image, and the texture property value may be a value returned from a function of pixel texture values of the at least one block of the texture image.

The function of pixel depth values may be at least one of: mean of the pixel depth values of the at least one block of the depth map image; median of the pixel depth values of the at least one block of the depth map image; histogram based value of the pixel depth values of the at least one block of the depth map image; and an output from a facial recognition algorithm for the pixel depth values of the at least one block of the depth map image.

The function of pixel depth values may be any combination of mean of the pixel depth values of the at least one block of the depth map image; median of the pixel depth values of the at least one block of the depth map image; histogram based value of the pixel depth values of the at least one block of the depth map image; and an output from a facial recognition algorithm for the pixel depth values of the at least one block of the depth map image.

The function of pixel texture values may be based on the frequency domain characteristics of the pixel texture values of the at least on block of the texture image.

In another aspect there is provided an apparatus configured to: partition a depth map image into at least one block; partition a texture image into at least one block, wherein the size and position of the at least one block of the texture image corresponds to the size and position of the at least one block of the depth image; determine a depth property value for the at least one block of the depth map image; determine a texture property value for the at least one block of the texture image; use the depth property value for the at least one block of the depth map image and the texture property value for the at least one block of the texture image to select a set of filter parameters from a look up table; and filter the at least one block of the depth map image with a filter based on the selected set of filter parameters.

The look up table may comprise a first dimension of a plurality of intervals of the depth property value and a second dimension of a plurality of intervals of the texture property value, and each combination of interval of the plurality of intervals of the depth property value and interval of the plurality of intervals of the texture property value may reference a distinct set of filter parameters.

The filter strength for filtering the at least one block of the depth map image may be determined by the selected set of filter parameters, and each of the distinct sets of filter parameters in the look up table may have been tuned according to their respective interval of depth property value and respective interval of texture property value.

Each of the plurality of intervals of the depth property value spans a different range of depth property values, each of the plurality of intervals of the texture property value spans a different range of texture property values, and the apparatus configured to use the depth property value and texture property value to select a set of filter parameters from a look up table can be further configured to: determining an interval of the plurality of intervals of the depth property value with which the depth property value for the at least one block of the depth map image lies; determining an interval of the plurality of intervals of the texture property value with which the texture property value for the at least one block of the texture image lies; and selecting the set of filter parameters referenced by the determined interval of the plurality of intervals of the depth property value and the determined interval of the plurality of intervals of the texture property value.

The depth property value may be a value returned from a function of pixel depth values of the at least one block of the depth map image, and the texture property value may be a value returned from a function of pixel texture values of the at least one block of the texture image.

The function of pixel depth values may be at least one of: mean of the pixel depth values of the at least one block of the depth map image; median of the pixel depth values of the at least one block of the depth map image; histogram based value of the pixel depth values of the at least one block of the depth map image; and an output from a facial recognition algorithm for the pixel depth values of the at least one block of the depth map image.

The function of pixel depth values may be any combination of: mean of the pixel depth values of the at least one block of the depth map image; median of the pixel depth values of the at least one block of the depth map image; histogram based value of the pixel depth values of the at least one block of the depth map image; and an output from a facial recognition algorithm for the pixel depth values of the at least one block of the depth map image.

The function of pixel texture values may be based on the frequency domain characteristics of the pixel texture values of the at least on block of the texture image.

According to a further aspect of embodiments there is provided an apparatus comprising at least one processor and at least one memory including computer code, the at least one memory and the computer code configured to with the at least one processor cause the apparatus to: partition a depth map image into at least one block; partition a texture image into at least one block, wherein the size and position of the at least one block of the texture image corresponds to the size and position of the at least one block of the depth image; determine a depth property value for the at least one block of the depth map image; determine a texture property value for the at least one block of the texture image; use the depth property value for the at least one block of the depth map image and the texture property value for the at least one block of the texture image to select a set of filter parameters from a look up table; and filter the at least one block of the depth map image with a filter based on the selected set of filter parameters.

The look up table may comprise a first dimension of a plurality of intervals of the depth property value and a second dimension of a plurality of intervals of the texture property value, each combination of interval of the plurality of intervals of the depth property value and interval of the plurality of intervals of the texture property value may reference a distinct set of filter parameters.

The filter strength for filtering the at least one block of the depth map image may be determined by the selected set of filter parameters, and each of the distinct sets of filter parameters in the look up table may have been tuned according to their respective interval of depth property value and respective interval of texture property value.

Each of the plurality of intervals of the depth property value spans a different range of depth property values, each of the plurality of intervals of the texture property value spans a different range of texture property values, and the apparatus caused to use the depth property value and texture property value to select a set of filter parameters from a look up table may be further caused to: determine an interval of the plurality of intervals of the depth property value with which the depth property value for the at least one block of the depth map image lies; determine an interval of the plurality of intervals of the texture property value with which the texture property value for the at least one block of the texture image lies; and select the set of filter parameters referenced by the determined interval of the plurality of intervals of the depth property value and the determined interval of the plurality of intervals of the texture property value.

The depth property value may be a value returned from a function of pixel depth values of the at least one block of the depth map image, and the texture property value may be a value returned from a function of pixel texture values of the at least one block of the texture image.

The function of pixel depth values can be at least one of: mean of the pixel depth values of the at least one block of the depth map image; median of the pixel depth values of the at least one block of the depth map image; histogram based value of the pixel depth values of the at least one block of the depth map image; and an output from a facial recognition algorithm for the pixel depth values of the at least one block of the depth map image.

The function of pixel depth values may be any combination of: mean of the pixel depth values of the at least one block of the depth map image; median of the pixel depth values of the at least one block of the depth map image; histogram based value of the pixel depth values of the at least one block of the depth map image; and an output from a facial recognition algorithm for the pixel depth values of the at least one block of the depth map image.

The function of pixel texture values can be based on the frequency domain characteristics of the pixel texture values of the at least on block of the texture image.

According to a further aspect of embodiments there is provided a non-transitory computer-readable storage medium having stored thereon computer-readable code, which, when executed by computing apparatus, causes the computing apparatus to: partition a depth map image into at least one block; partition a texture image into at least one block, wherein the size and position of the at least one block of the texture image corresponds to the size and position of the at least one block of the depth image; determine a depth property value for the at least one block of the depth map image; determine a texture property value for the at least one block of the texture image; use the depth property value for the at least one block of the depth map image and the texture property value for the at least one block of the texture image to select a set of filter parameters from a look up table; and filter the at least one block of the depth map image with a filter based on the selected set of filter parameters.

BRIEF DESCRIPTION OF DRAWINGS

For a better understanding of the present application and as to how the same may be carried into effect, reference will now be made by way of example to the accompanying drawings in which.

DESCRIPTION OF SOME EMBODIMENTS

Figure 1A:
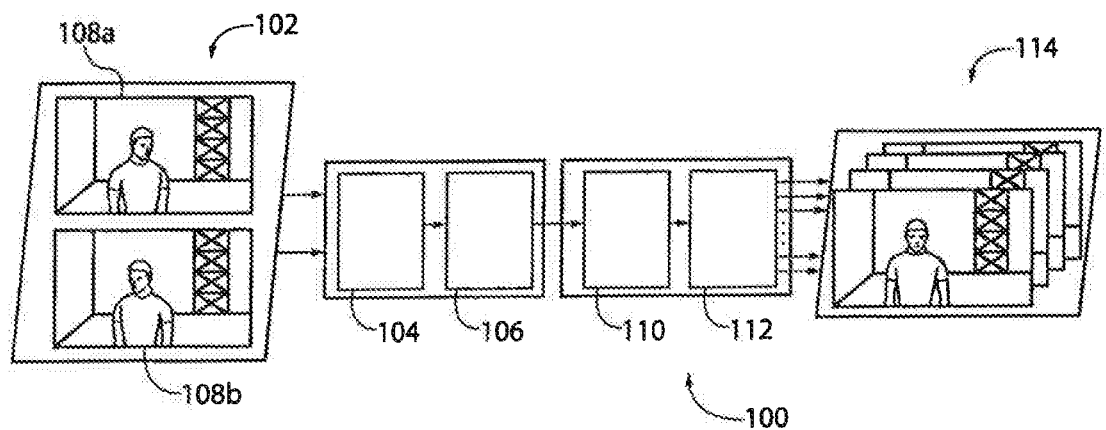
FIG. 1a: shows a block diagram representation of a system for 3 dimensional video (3DV) rendering according to some embodiments.

The following describes in more detail possible depth map filtering mechanisms for three dimensional and multi view video codecs.

Several 3-D video data formats and 3-D video coding strategies are configured to support rendering of 3D video applications. Certain depth enhanced video coding standards facilitate in rendering 3D videos based on the depth. It is to be appreciated that the term 'depth-enhanced video' as used herein refers to texture videos having one or more texture views associated with depth video having one or more depth views. A 'texture view' can refer to a view that may represent ordinary video content, for example, the video content that may be captured using an ordinary camera, and is usually suitable for rendering on a display. A texture view may typically include pictures having three components or sample arrays, namely, one luma component and two chroma components. In the following description, a texture picture or texture image typically includes all its component pictures or color components unless otherwise indicated for example with terms luma texture picture and chroma texture picture. A texture picture or image may also be referred to as a texture view component.

Ranging information for a particular view represents distance information of a texture sample from the camera sensor, disparity or parallax information between a texture sample and a respective texture sample in another view, or similar information. Ranging information of real-word 3D scene depends on the content and may vary for example from 0 to infinity. Herein, different types of representation of such ranging information can be utilized.

It is to be appreciated that the term 'depth view' may refer to a view that represents distance information of a texture sample from the camera sensor, disparity or parallax information between a texture sample and a respective texture sample in another view, or similar information. A depth view may include depth images (which may be also referred to as depth image maps and depth view components) having one component, similar to the luma component of texture views. The other color components, similar to chroma components of texture views, may be absent in the depth views, and may be set to default values (e.g. by an encoder) and/or may be omitted (e.g. by a decoder).

A depth map image may be considered to represent the values related to the distance of the surfaces of the scene objects from a reference location, for example a view point of an observer. A depth map image is an image that may include per-pixel depth information or any similar information. For example, each sample in a depth map image represents the distance of the respective texture sample or samples from the plane on which the camera lies. In other words, if the z axis is along the shooting axis of the cameras (and hence orthogonal to the plane on which the cameras lie), a sample in a depth map image represents the value on the z axis.

Since depth map images are generated containing a depth value for each pixel in the image, they can be depicted as gray-level images or images containing only the luma component. Alternatively chroma components of the depth map images may be set to a pre-defined value, such as a value indicating no chromaticity, e.g. 128 in typical 8-bit chroma sample arrays, where a zero chromaticity level is arranged into the middle of the value range. Alternatively, chroma components of depth map images may be used to contain other picture data, such as any type of monochrome auxiliary pictures, such as alpha planes.

Another approach to represent the depth values of different views in the stereoscopic or multiview case is to report the disparity between pixels of each view to the adjacent view instead of the actual depth values. The following equation shows how depth values are converted to disparity:

$$D = f \times l \times \left( \frac{d}{2^N - 1} \times \left( \frac{1}{Z_{near}} - \frac{1}{Z_{far}} \right) + \frac{1}{Z_{far}} \right)$$

where: D is the disparity value, f is the focal length of capturing camera, l is the translational difference between cameras, d is the depth map value, N is the number of bits representing the depth map values, and Znear and Zfar are the respective distances of the closest and farthest objects in the scene to the camera (mostly available from the content provider), respectively.

The semantics of depth map values may for example include the following:

1. Each luma sample value in a coded depth view component represents an inverse of real-world distance (Z) value, i.e. 1/Z, normalized in the dynamic range of the luma samples, such as to the range of 0 to 255, inclusive, for 8-bit luma representation. The normalization may be done in a manner where the quantization 1/Z is uniform in terms of disparity.

2. Each luma sample value in a coded depth view component represents an inverse of real-world distance (Z) value, i.e. 1/Z, which is mapped to the dynamic range of the luma samples, such as to the range of 0 to 255, inclusive, for 8-bit luma representation, using a mapping function $f(1/Z)$ or table, such as a piece-wise linear mapping. In other words, depth map values result in applying the function $f(1/Z)$.

3. Each luma sample value in a coded depth view component represents a real-world distance (Z) value normalized in the dynamic range of the luma samples, such as to the range of 0 to 255, inclusive, for 8-bit luma representation.

4. Each luma sample value in a coded depth view component represents a disparity or parallax value from the present depth view to another indicated or derived depth view or view position.

The semantics of depth map values may be indicated in the bit-stream, for example, within a video parameter set syntax structure, a sequence parameter set syntax structure, a video usability information syntax structure, a picture parameter set syntax structure, a camera/depth/adaptation parameter set syntax structure, a supplemental enhancement information message, or anything alike.

An encoding system or any other entity creating or modifying a bitstream including coded depth image maps may create and include information on the semantics of depth samples and on the quantization scheme of depth samples into the bitstream. Such information on the semantics of depth samples and on the quantization scheme of depth samples may be for example included in a video parameter set structure, in a sequence parameter set structure, or in a supplemental enhancement information (SEI) message.

The multi-view video plus depth (MVD) representation may refer to a set of texture views accompanied with depth image maps. One reason to include depth image maps is to exploit them in different de(coding) and post processing steps e.g. increase the efficiency of texture view compression or use them in view synthesis. The higher the quality and/or spatial resolution of depth map, the better the quality of virtual rendered views and the less the synthesis artifacts presented in the rendered views. However, in some cases, if the depth image map quality and/or resolution is very low, the synthesis artifacts in rendered view might dominate the subjective quality which may result in a poor viewing experience for the end user.

In a scheme referred to as unpaired MVD, there may be an unequal number of texture views and depth views, and/or some of the texture views might not have a co-located depth view, and/or some of the depth views might not have a co-located texture view, some of the depth view components might not be temporally coinciding with texture view components or vice versa, co-located texture and depth views might cover a different spatial area, and/or there may be more than one type of depth view components. Encoding, decoding, and/or processing of unpaired MVD signal may be facilitated by a depth-enhanced video coding, decoding, and/or processing scheme.

Terms co-located, collocated, and overlapping may be used interchangeably to indicate that a certain sample or area in a texture view component represents the same physical objects or fragments of a 3D scene as a certain co-located/collocated/overlapping sample or area in a depth view component. Different cases of sampling grid alignment between a texture view component and a depth view component are presented in the following:

In some cases, the sampling grid of a texture view component may be the same as the sampling grid of a depth view component, i.e. one sample of a component image, such as a luma image, of a texture view component corresponds to one sample of a depth view component, i.e. the physical dimensions of a sample match between a component image, such as a luma image, of a texture view component and the corresponding depth view component.

In some cases, sample dimensions ($t_{width} \times t_{height}$) of a sampling grid of a component image, such as a luma image, of a texture view component may be an integer multiple of sample dimensions ($d_{width} \times d_{height}$) of a sampling grid of a depth view component, i.e. $t_{width} = m \times d_{width}$ and $t_{height} = n \times d_{height}$, where m and n are positive integers. In some embodiments, $d_{width} = m \times t_{width}$ and $d_{height} = n \times t_{height}$, where m and n are positive integers.

In some cases, $t_{width} = m \times d_{width}$ and $t_{height} = n \times d_{height}$ or alternatively $d_{width} = m \times t_{width}$ and $d_{height} = n \times t_{height}$, where m and n are positive values and may be non-integer. In these cases, an interpolation scheme may be used in the encoder and in the decoder and in the view synthesis process and other processes to derive co-located sample values between texture and depth.

In some cases, the physical position of a sampling grid of a component image, such as a luma image of a texture view component may match that of the corresponding depth view and the sample dimensions of a component image, such as a luma image of the texture view component may be an integer multiple of sample dimensions ($d_{width} \times d_{height}$) of a sampling grid of the depth view component (or vice versa)—then, the texture view component and the depth view component may be considered to be co-located and represent the same viewpoint.

In some cases, the position of a sampling grid of a component image, such as a luma image, of a texture view component may have an integer-sample offset relative to the sampling grid position of a depth view component, or vice versa. In other words, a top-left sample of a sampling grid of a component image, such as a luma image, of a texture view component may correspond to the sample at position (x, y) in the sampling grid of a depth view component, or vice versa, where x and y are non-negative integers in a two-dimensional Cartesian coordinate system with non-negative values only in the top-left corner. In some cases, the values of x and/or y may be non-integer and consequently an interpolation scheme may be used in the encoder and in the decoder and in the view synthesis process and other processes to derive co-located sample values between texture and depth.

In some cases, the sampling grid of a component image, such as a luma image, of a texture view component may have unequal extents compared to those of the sampling grid of a depth view component. In other words, the number of samples in horizontal and/or vertical direction in a sampling grid of a component image, such as a luma image, of a texture view component may differ from the number of samples in horizontal and/or vertical direction, respectively, in a sampling grid of a depth view component and/or the physical width and/or height of a sampling grid of a component image, such as a luma image, of a texture view component may differ from the physical width and/or height, respectively, of a sampling grid of a depth view component.

In some cases, non-uniform and/or non-matching sample grids can be utilized for texture and/or depth component. A sample grid of depth view component is non-matching with the sample grid of a texture view component when the sampling grid of a component image, such as a luma image, of the texture view component is not an integer multiple of sample dimensions ($d_{width} \times d_{height}$) of a sampling grid of the depth view component or the sampling grid position of a component image, such as a luma image, of the texture view component has a non-integer offset compared to the sampling grid position of the depth view component or the sampling grids of the depth view component and the texture view component are not aligned/rectified. This may happen for example on purpose to reduce redundancy of data in one of the components or due to inaccuracy of the calibration/rectification process between a depth sensor and a color image sensor.

A number of approaches may be used for coding of depth-enhanced video, including the use of auxiliary depth map video streams, MVD, and layered depth video (LDV). The depth map video stream for a single view may be regarded as a regular monochromatic video stream and coded with any video codec. The essential characteristics of the depth map stream, such as the minimum and maximum depth in world coordinates, can be indicated, for example, in messages formatted according to the MPEG-C Part 3 standard. In the video plus depth (V+D) representation, the depth map image sequence may be coded independently with any video codec, such as the Advanced Video Coding standard (H.264/AVC), or included as auxiliary pictures within the same video bit-stream as the texture video. In the MVD representation, the depth map image sequence for each texture view is coded with any video codec, such as the Multiview Video Coding extension (MVC) of H.264/AVC. In the LDV representation, the texture and depth of the central view are coded conventionally, while the texture and depth of the other views are partially represented and cover only the dis-occluded areas required for correct view synthesis of intermediate views.

Depth-enhanced video may be coded in a manner where texture and depth are coded independent of each other. For example, texture views may be coded as one MVC bitstream and depth views may be coded as another MVC bitstream. Depth-enhanced video may also be coded in a manner where texture and depth views are jointly coded. In a form of a joint coding of texture and depth views, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. In another option, coded video data of texture and coded video data of depth are not predicted from each other or one is not coded/decoded on the basis of the other one, but coded texture and depth view may be multiplexed into the same bitstream in the encoding and demultiplexed from the bitstream in the decoding. In yet another option, while coded video data of texture is not predicted from coded video data of depth in e.g. below slice layer, some of the high-level coding structures of texture views and depth views may be shared or predicted from each other. For example, a slice header of coded depth slice may be predicted from a slice header of a coded texture slice. Moreover, some of the parameter sets may be used by both coded texture views and coded depth views.

A system for 3D video rendering is illustrated and explained with reference to FIG. 1a. The detailed operation of view synthesis algorithms depend on which representation format has been used for texture views and depth map image sequences. Although differing in details, most of the view synthesis algorithms utilize 3D warping based on explicit geometry, i.e., depth images. An example representation of view synthesis is illustrated and explained with reference to FIG. 1b.

FIG. 1a illustrates an example block diagram representation of a system for 3D video (3DV) rendering, in accordance with an example embodiment. In an embodiment, the 3DV system 100 is based on the use of depth enhanced MVD format.

As illustrated in FIG. 1a, the system 100 may include a sending side and a receiving side. The sending side is configured to generate an encoded media content and send the encoded media content to the receiving side. The receiving side is configured to decode the encoded media content and present the decoded media content, for example on a display device.

In an example embodiment, the sending side may include an input device 102, for example a camera, a processor 104, and an encoder 106. In an embodiment, the camera is configured to capture the media content. In an example embodiment, the camera 102 may be configured to capture multiple views of a scene. For example, the camera 102 may capture view images 108a and 108b of a scene, as illustrated in FIG. 1A. In an embodiment, the camera 102 may be configured to provide the captured media content to the processor 104. The processor 104 may be configured to determine depth information associated with the scene based on the captured view images of the scene, and provide the same to the encoder 106. The encoder 106 is configured to encode multiple view images based at least on the depth information received from the processor 104, and generate a bit stream which can be decoded at the receiving side. The encoder 106 is further configured to transmit the bit stream comprising the encoded video content to the receiving side of the system 100.

In an example embodiment, the receiving side includes a decoder 110 and a view synthesis device 112. In an example embodiment, the decoder 110 is configured to decode the encoded media content (or the bit stream) received from the sending side. The bit stream includes color and depth data corresponding to the view images. The decoder 110 may provide the decoded media content to the view synthesis device 112. The view synthesis device 112 may be configured to generate multiple views, for example views 114 for an autostereoscopic multiview display within a given range across the transmitted view images. In an embodiment, the MVD format enables depth-image-based rendering (DIBR) or view synthesis of additional viewpoints in the decoding side for advanced application scenarios. An example representation of view synthesis is illustrated and explained with reference to FIG. 1b.

View synthesis or DIBR may be used for example for but is not limited to one of more of usages:
DIBR enables disparity adjustment between the two views displayed on a conventional stereoscopic display. The disparity adjustment may be regarded as an adjustment of the amount of perceived depth in the video content. The disparity adjustment may be performed manually, as controlled by a user. Additionally or alternatively, the disparity adjustment may be performed on the basis of detected or expected distance of the viewer(s) from the display and/or the known display width.
Multiview auto-stereoscopic displays require several tens of views to be displayed. DIBR enables generation of intermediate views for auto-stereoscopic displays.
In some interactive applications a user can select a viewpoint to the multiview content. For example, head and/or gaze tracking may be used to detect user's head position and/or gaze direction and select a view to be displayed accordingly. DIBR enables generation of a desired viewpoint and/or view direction.

Figure 1B:
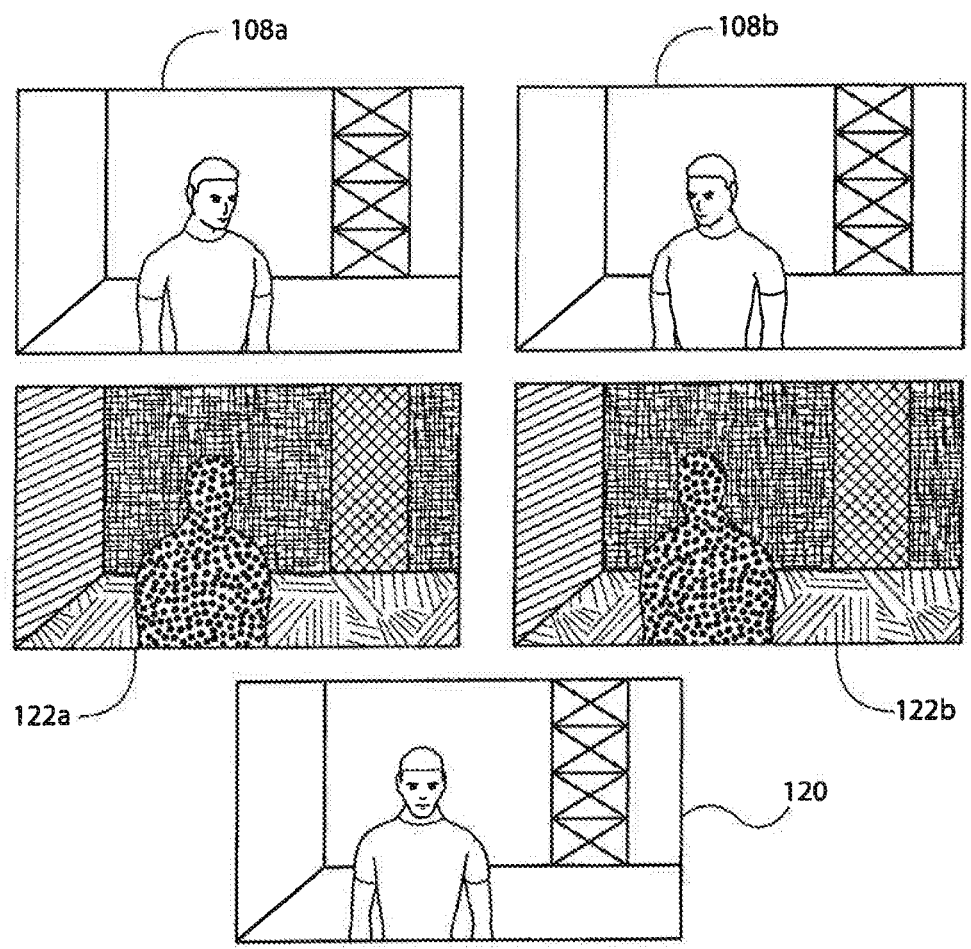
FIG. 1b: shows an example representation of view synthesis according to some embodiments.

FIG. 1b illustrates an example representation of view synthesis in accordance with an example embodiment. Herein, the term 'view synthesis' or Depth-image-based rendering (DIBR) refers to generation of a new view based on one or more existing/received views. For example, as illustrated in FIG. 1b, a left view 108a and a right view image 108b of a scene are represented. Now, after performing view synthesis by, for example, the view synthesis device 112, a new image, for example an image 120 of the scene may be generated that may include objects of the scene being viewed from a new view-point.

In an embodiment, depth images may be utilized to assist in correct synthesis of the virtual views. Although differing in details, most of the view synthesis algorithms utilize 3D warping based on explicit geometry, i.e., depth images, where each texture pixel is associated with a depth pixel indicating the distance or the z-value from the camera to the physical object from which the texture pixel was sampled. In an embodiment, the distance of the depth pixels from the camera may be represented by a depth map image. In particular, the depth map image presents the values related to the distance of the surfaces of the scene objects from the view point of observer/camera. Since depth map images are generated containing a depth value for each pixel in the image, the depth map images can be depicted as gray-level images. Referring to FIG. 1b, examples of depth map images 122a, 122b corresponding to view images 108a, 108b are illustrated in which the depth of different surfaces and objects located at different depths in the scene are represented by varying shadings of gray.

Depth image maps may be considered approximately piecewise planar, with highly homogeneous regions separated by strong contours. As a result, by preserving more contours, the possibility of exploiting depth map image for virtual view synthesis issues may be increased. Moreover, codecs should be capable of compressing the depth-enhanced multi-view content with increased efficiency so as to enable reduction of required bitrate. Various embodiments disclose methods and apparatus that facilitate in compression and transfer of depth-enhanced multi-view content with increased efficiency. In various example embodiments, methods and apparatus are provided that facilitate in preserving the quality of foreground portion of the media content while removing certain details of the background portion, thereby facilitating lower coding bitrate without sacrificing the subjective quality of the media content. An example 3DV system for coding of the video content is explained further in detail with reference to FIG. 2.

Figure 2:
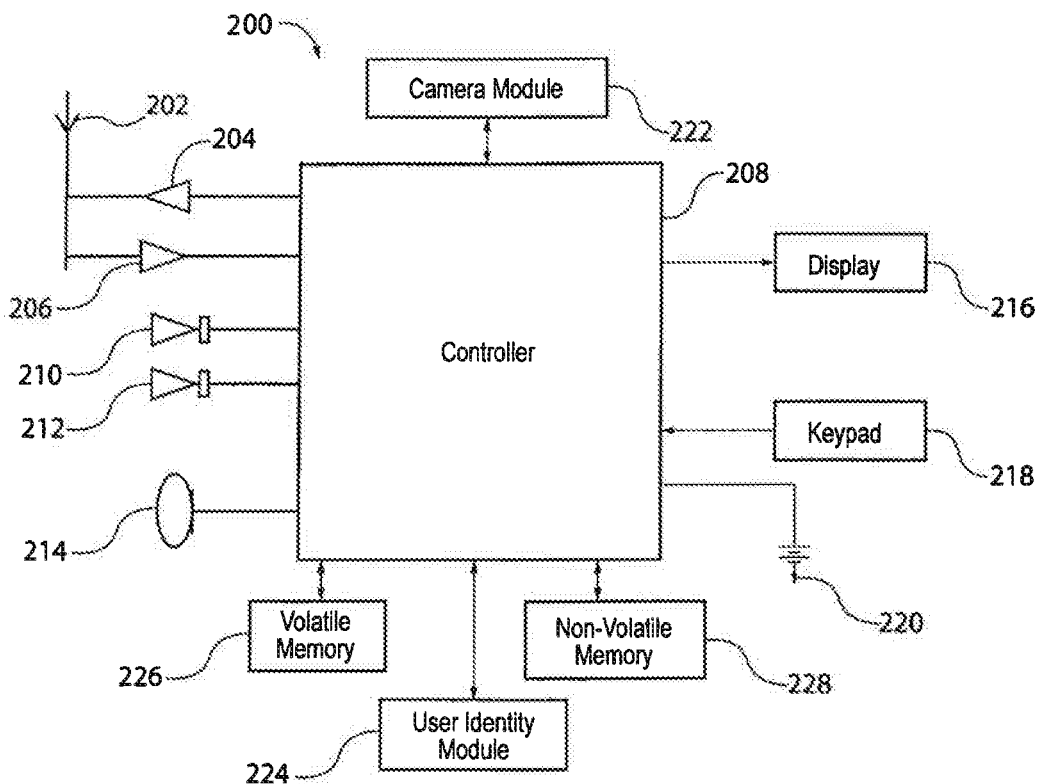
FIG. 2: shows schematically an electronic device employing some embodiments.

FIG. 2 illustrates an example device 200, in accordance with an example embodiment. It should be understood, however, that the device 200 as illustrated and hereinafter described is merely illustrative of one type of device that may benefit from various embodiments, therefore, should not be taken to limit the scope of the embodiments. As such, it should be appreciated that at least some of the components described below in connection with the device 200 may be optional and thus in an example embodiment may include more, less or different components than those described in connection with the example embodiment of FIG. 2. The device 200 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 200 may include an antenna 202 (or multiple antennas) in operable communication with a transmitter 204 and a receiver 206. The device 200 may further include an apparatus, such as a controller 208 or other processing device that provides signals to and receives signals from the transmitter 204 and receiver 206, respectively. The signals may include signaling information in accordance with the air interface standard of the applicable cellular system, and/or may also include data corresponding to user speech, received data and/or user generated data. In this regard, the device 200 may be capable of operating with one or more air interface standards, communication protocols, modulation types, and access types. By way of illustration, the device 200 may be capable of operating in accordance with any of a number of first, second, third and/or fourth-generation communication protocols or the like. For example, the device 200 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 200 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 208 may include circuitry implementing, among others, audio and logic functions of the device 200. For example, the controller 208 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 200 are allocated between these devices according to their respective capabilities. The controller 208 thus may also include the functionality to convolutionally encode and interleave message and data prior to modulation and transmission. The controller 208 may additionally include an internal voice coder, and may include an internal data modem. Further, the controller 208 may include functionality to operate one or more software programs, which may be stored in a memory. For example, the controller 208 may be capable of operating a connectivity program, such as a conventional Web browser. The connectivity program may then allow the device 200 to transmit and receive Web content, such as location-based content and/or other web page content, according to a Wireless Application Protocol (WAP), Hypertext Transfer Protocol (HTTP) and/or the like. In an example embodiment, the controller 208 may be embodied as a multi-core processor such as a dual or quad core processor. However, any number of processors may be included in the controller 208.

The device 200 may also comprise a user interface including an output device such as a ringer 210, an earphone or speaker 212, a microphone 214, a display 216, and a user input interface, which may be coupled to the controller 208. The user input interface, which allows the device 200 to receive data, may include any of a number of devices allowing the device 200 to receive data, such as a keypad 218, a touch display, a microphone or other input device. The device 200 further includes a battery 220, such as a vibrating battery pack, for powering various circuits that are used to operate the device 200, as well as optionally providing mechanical vibration as a detectable output.

In embodiments, the device 200 includes a media capturing element, such as a camera, video and/or audio module, in communication with the controller 208. The media capturing element may be any means for capturing an image, video and/or audio for storage, display or transmission. In an example embodiment in which the media capturing element is a camera module 222, the camera module 222 may include a digital camera capable of forming a digital image file from a captured image. As such, the camera module 222 includes all hardware, such as a lens or other optical component(s), and software for creating a digital image file from a captured image. Alternatively, the camera module 222 may include the hardware needed to view an image, while a memory device of the device 200 stores instructions for execution by the controller 208 in the form of software to create a digital image file from a captured image. In an example embodiment, the camera module 222 may further include a processing element such as a co-processor, which assists the controller 208 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264/AVC (i.e. ITU-T Recommendation H.264, which is technically identical to ISO/IEC International Standard 14496-10, i.e. MPEG-4 Part 10), MPEG-4 Visual (i.e. MPEG-4 Part 2), H.265/HEVC and the like. In some cases, the camera module 222 may provide live image data to the display 216. Moreover, in an example embodiment, the display 216 may be located on one side of the device 200 and the camera module 222 may include a lens positioned on the opposite side of the device 200 with respect to the display 216 to enable the camera module 222 to capture images on one side of the device 200 and present a view of such images to the user positioned on the other side of the device 200.

The device 200 may further include a user identity module (UIM) 224. The UIM 224 may be a memory device having a processor built in. The UIM 224 may include, for example, a subscriber identity module (SIM), a universal integrated circuit card (UICC), a universal subscriber identity module (USIM), a removable user identity module (R-UIM), or any other smart card. The UIM 224 typically stores information elements related to a mobile subscriber. In addition to the UIM 224, the device 200 may be equipped with memory. For example, the device 200 may include volatile memory 226, such as volatile random access memory (RAM) including a cache area for the temporary storage of data. The device 200 may also include other non-volatile memory 228, which may be embedded and/or may be removable. The non-volatile memory 228 may additionally or alternatively comprise an electrically erasable programmable read only memory (EEPROM), flash memory, hard drive, or the like. The memories may store any number of pieces of information, and data, used by the device 200 to implement the functions of the device 200.

Figure 3:
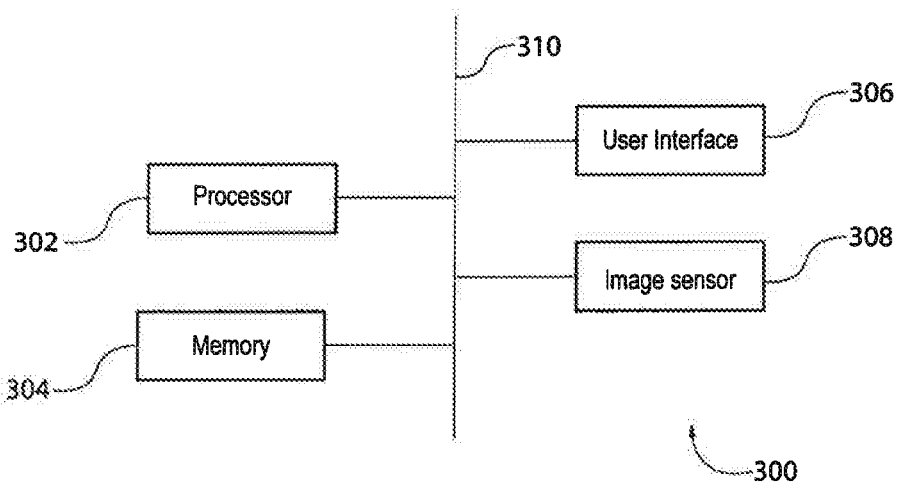
FIG. 3: shows schematically an example apparatus for filtering a depth map image.

FIG. 3 illustrates an apparatus 300 for filtering and encoding image and video, in accordance with embodiments. The apparatus 300 may be employed, for example, in the device 200 of FIG. 2. However, it should be noted that the apparatus 300, may also be employed on a variety of other devices both mobile and fixed, and therefore, embodiments should not be limited to application on devices such as the device 200 of FIG. 2. Alternatively, embodiments may be employed on a combination of devices including, for example, those listed above. Accordingly, various embodiments may be embodied wholly at a single device, for example, the device 200 or in a combination of devices. Furthermore, it should be noted that the devices or elements described below may not be mandatory and thus some may be omitted in certain embodiments.

The apparatus 300 includes or otherwise is in communication with at least one processor 302 and at least one memory 304. Examples of the at least one memory 304 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 304 may be configured to store information, data, applications, instructions or the like for enabling the apparatus 300 to carry out various functions in accordance with various example embodiments. For example, the memory 304 may be configured to buffer input data comprising media content for processing by the processor 302. Additionally or alternatively, the memory 304 may be configured to store instructions for execution by the processor 302.

An example of the processor 302 may include the controller 208. The processor 302 may be embodied in a number of different ways. The processor 302 may be embodied as a multi-core processor, a single core processor; or combination of multi-core processors and single core processors. For example, the processor 302 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 304 or otherwise accessible to the processor 302. Alternatively or additionally, the processor 302 may be configured to execute hard coded functionality. As such, whether configured by hardware or software methods, or by a combination thereof, the processor 302 may represent an entity, for example, physically embodied in circuitry, capable of performing operations according to various embodiments while configured accordingly. For example, if the processor 302 is embodied as two or more of an ASIC, FPGA or the like, the processor 302 may be specifically configured hardware for conducting the operations described herein. Alternatively, as another example, if the processor 302 is embodied as an executor of software instructions, the instructions may specifically configure the processor 302 to perform the algorithms and/or operations described herein when the instructions are executed. However, in some cases, the processor 302 may be a processor of a specific device, for example, a mobile terminal or network device adapted for employing embodiments by further configuration of the processor 302 by instructions for performing the algorithms and/or operations described herein. The processor 302 may include, among other things, a clock, an arithmetic logic unit (ALU) and logic gates configured to support operation of the processor 302.

A user interface 306 may be in communication with the processor 302. Examples of the user interface 306 include, but are not limited to, input interface and/or output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Other examples of input interface may include motion detectors, eye gaze trackers and the like. Examples of the output interface may include, but are not limited to, a display such as light emitting diode display, thin-film transistor (TFT) display, liquid crystal displays, active-matrix organic light-emitting diode (AMO-LED) display, a microphone, a speaker, ringers, vibrators, and the like. In an example embodiment, the user interface 306 may include, among other devices or elements, any or all of a speaker, a microphone, a display, and a keyboard, touch screen, or the like. In this regard, for example, the processor 302 may comprise user interface circuitry configured to control at least some functions of one or more elements of the user interface 306, such as, for example, a speaker, ringer, microphone, display, and/or the like. The processor 302 and/or user interface circuitry comprising the processor 302 may be configured to control one or more functions of one or more elements of the user interface 206 through computer program instructions, for example, software and/or firmware, stored on a memory, for example, the at least one memory 304, and/or the like, accessible to the processor 302.

In embodiments, the apparatus 300 may include an electronic device. Some examples of the electronic device include communication device, media capturing device with or without communication capabilities, computing devices, and the like. Some examples of the electronic device may include a mobile phone, a personal digital assistant), and the like. Some examples of computing device may include a laptop, a personal computer, and the like. In an example embodiment, the electronic device may include a user interface, for example, the user interface 306, having user interface circuitry and user interface software configured to facilitate a user to control at least one function of the electronic device through use of a display and further configured to respond to user inputs. In an example embodiment, the electronic device may include a display circuitry configured to display at least a portion of the user interface 306 of the electronic device. The display and display circuitry may be configured to facilitate the user to control at least one function of the electronic device.

In embodiments, the electronic device may be embodied as to include a transceiver. The transceiver may be any device operating or circuitry operating in accordance with software or otherwise embodied in hardware or a combination of hardware and software. For example, the processor 302 operating under software control, or the processor 302 embodied as an ASIC or FPGA specifically configured to perform the operations described herein, or a combination thereof, thereby configures the apparatus 300 or circuitry to perform the functions of the transceiver. The transceiver may be configured to receive media content. Examples of the media content may include audio content, video content, data, and a combination thereof.

In embodiments, the electronic device may be embodied as to include one or more camera, for example a camera represented as image sensor 308. In various example embodiments, the camera 308 may be in communication with the processor 302 and/or other components of the apparatus 300. The camera 308 may be in communication with other imaging circuitries and/or software, and is configured to capture digital images or to make a video or other graphic media files. The camera 308 and other circuitries, in combination, may be an example of at least one camera module such as the camera module 222 of the device 200. In an example embodiment, the camera 308 may include a main lens, a sensor, and a plurality of micro-lenses placed between the main lens and the sensor.

These components (302-308) may communicate to each other via a centralized circuit system 310 to facilitate video encoding. The centralized circuit system 310 may be configured to, among other things, provide or enable communication between the components (302-308) of the apparatus 300. In certain embodiments, the centralized circuit system 310 may be a central printed circuit board (PCB) such as a motherboard, main board, system board, or logic board. The centralized circuit system 310 may also, or alternatively, include other printed circuit assemblies (PCAs) or communication channel media.

In embodiments, the processor 302 is configured to, with the content of the memory 304, and optionally with other components described herein, to cause the apparatus 300 to facilitate receipt of a media content associated with a scene. Herein, the 'scene' refers to arrangement (natural, manmade, sorted or assorted) of one or more objects of which the images or videos can be captured, or of which the preview can be generated. In this example embodiment, the plurality of scene may be captured by the camera that may be present in the apparatus 300. In another example embodiment, the apparatus 300 may be caused to send instructions for capturing of a plurality of view images of the scene by an external camera that is accessible/communicably coupled to the apparatus 300. Herein, the camera includes any camera that is capable of capturing image/video data of the scene, such that multiple views of the same scene may be generated. In some example embodiments, the plurality of view images may be prerecorded or stored in an apparatus 300, or may be received from sources external to the apparatus 300. In such example embodiments, the apparatus 300 is caused to receive the plurality of view images from external storage medium such as DVD, Compact Disk (CD), flash drive, memory card, or from external storage locations through Internet, Bluetooth®, and the like. In an example embodiment, a processing means may be configured to facilitate receipt of the plurality of view images of the scene. An example of the processing means may include the processor 302, which may be an example of the controller 208.

In embodiments, the apparatus 300 is caused to determine at least one depth map image from the plurality of view images. For example, the apparatus 300 may be configured to determine a depth map image D from a first view image $I_1$ and a second view image $I_2$ of the plurality of view images. In an example embodiment, the first view image $I_1$ may be a left view image of the scene while the second view image $I_2$ may be a right view image of the scene. In an example embodiment, the view images 108a, 108b in FIG. 1a may be examples of the first view image and the second view image, respectively.

In an embodiment, the apparatus 300 is caused to determine the depth map image from the first view image and the second view image based on a matching of corresponding pixels of the first view image and the second view image. Herein, the determination of the depth map image is explained by considering two images. It will however be noted that a plurality of depth map images may be generated from the plurality of view images received from the camera, for example, the camera 308. For example, the apparatus 300 may be caused to receive view images $I_1$, $I_2$, $I_3$ and $I_4$ (hereinafter referred to as the view images ($I_1$-$I_4$)). The apparatus 300 may further be caused to determine shifts between the images of the plurality of view images, for example view images ($I_1$-$I_4$). In an example embodiment, the shifts between the view images ($I_1$-$I_4$) and a reference image may be determined. In an example embodiment, the reference view image may be selected from the plurality of view images ($I_1$-$I_4$). For instance, the view image $I_1$ may be selected as the reference image. In an example embodiment, the corresponding shifts of the view images ($I_1$-$I_4$) may be determined with respect to the view image $I_1$. In an example embodiment, a processing means may be configured to determine shifts between the images of the plurality of view images ($I_1$-$I_4$). An example of the processing means may include the processor 302, which may be an example of the controller 208, and/or the camera 308 including gyroscope.

In an example embodiment, the apparatus 300 is caused to generate a plurality of depth map images for the plurality of view images ($I_1$-$I_4$). In an example embodiment, for each view image, a corresponding depth map image is generated. For example, depth map images $d_1$, $d_2$, $d_3$ and $d_4$ may be generated corresponding to the views images $I_1$, $I_2$, $I_3$ and $I_4$, respectively. The depth map images ($d_1$-$d_4$) for the view images ($I_1$-$I_4$) may be generated by many suitable techniques known in art. In an example embodiment, a processing means may be configured to generate the plurality of depth map images for the plurality of images ($I_1$-$I_4$). An example of the processing means may include the processor 302, which may be an example of the controller 208.

In an example embodiment, the depth map may include depth information associated with the scene. The depth information may be obtained by various means. For example, depth of the 3D scene may be computed from the disparity registered by capturing cameras or color image sensors. A depth estimation approach, which may also be referred to as stereo matching, includes taking a stereoscopic view as an input and computing local disparities between the two offset images of the view. Since the two input views represent different viewpoints or perspectives, the parallax creates a disparity between the relative positions of scene points on the imaging planes depending on the distance of the points. A target of stereo matching is to extract those disparities by finding or detecting the corresponding points between the images. Stereo matching may be performed based on various approaches. For example, in a block or template matching approach each image is processed pixel by pixel in overlapping blocks, and for each block of pixels a horizontally localized search for a matching block in the offset image is performed. Once a pixel-wise disparity is computed, the corresponding depth value z may be calculated by the following equation:

$$z = \frac{f \cdot b}{d + \Delta d}$$

where, f is the focal length of the camera and b is the baseline distance between cameras. Further, d may be considered to refer to the disparity observed between the two cameras or the disparity estimated between corresponding pixels in the two cameras. The camera offset $\Delta d$ may be considered to reflect a possible horizontal misplacement of the optical centers of the two cameras or a possible horizontal cropping in the camera frames due to pre-processing. However, since the algorithm is based on block matching, the quality of a depth-through-disparity estimation is content dependent and very often not accurate. For example, no straightforward solution for depth estimation is possible for image fragments that are featuring very smooth areas with no textures or large level of noise.

Alternatively or in addition to the above-described stereo view depth estimation, the depth value may be obtained using the time-of-flight (TOF) principle for example by using a camera which may be provided with a light source, for example an infrared emitter, for illuminating the scene. Such an illuminator may be arranged to produce an intensity modulated electromagnetic emission for a frequency between e.g. 10-100 MHz, which may require LEDs or laser diodes to be used. Infrared light may be used to make the illumination unobtrusive. The light reflected from objects in the scene is detected by an image sensor, which may be modulated synchronously at the same frequency as the illuminator. The image sensor may be provided with optics; a lens gathering the reflected light and an optical band pass filter for passing only the light with the same wavelength as the illuminator, thus helping to suppress background light. The image sensor may measure for each pixel the time the light has taken to travel from the illuminator to the object and back. The distance to the object may be represented as a phase shift in the illumination modulation, which can be determined from the sampled data simultaneously for each pixel in the scene.

Alternatively or in addition to the above-described stereo view depth estimation and/or TOF-principle depth sensing, depth values may be obtained using a structured light approach which may operate for example approximately as follows. A light emitter, such as an infrared laser emitter or an infrared LED emitter, may emit light that may have a certain direction in a 3D space (e.g. follow a raster-scan or a pseudo-random scanning order) and/or position within an array of light emitters as well as a certain pattern, e.g. a certain wavelength and/or amplitude pattern. The emitted light is reflected back from objects and may be captured using a sensor, such as an infrared image sensor. The image/signals obtained by the sensor may be processed in relation to the direction of the emitted light as well as the pattern of the emitted light to detect a correspondence between the received signal and the direction/position of the emitted lighted as well as the pattern of the emitted light for example using a triangulation principle. From this correspondence a distance and a position of a pixel may be concluded.

It is to be understood that the above-described depth estimation and sensing methods are provided as non-limiting examples and embodiments may be realized with the described or any other depth estimation and sensing methods and apparatuses.

The concept as described herein may proceed from the consideration that objects in the foreground are of more interest to the viewer than objects in the background, and that preserving the quality of rendered image objects in the foreground whilst removing detail from the background can result in an overall lower coding rate without sacrificing overall subjective quality of the decoded image.

Figure 4:
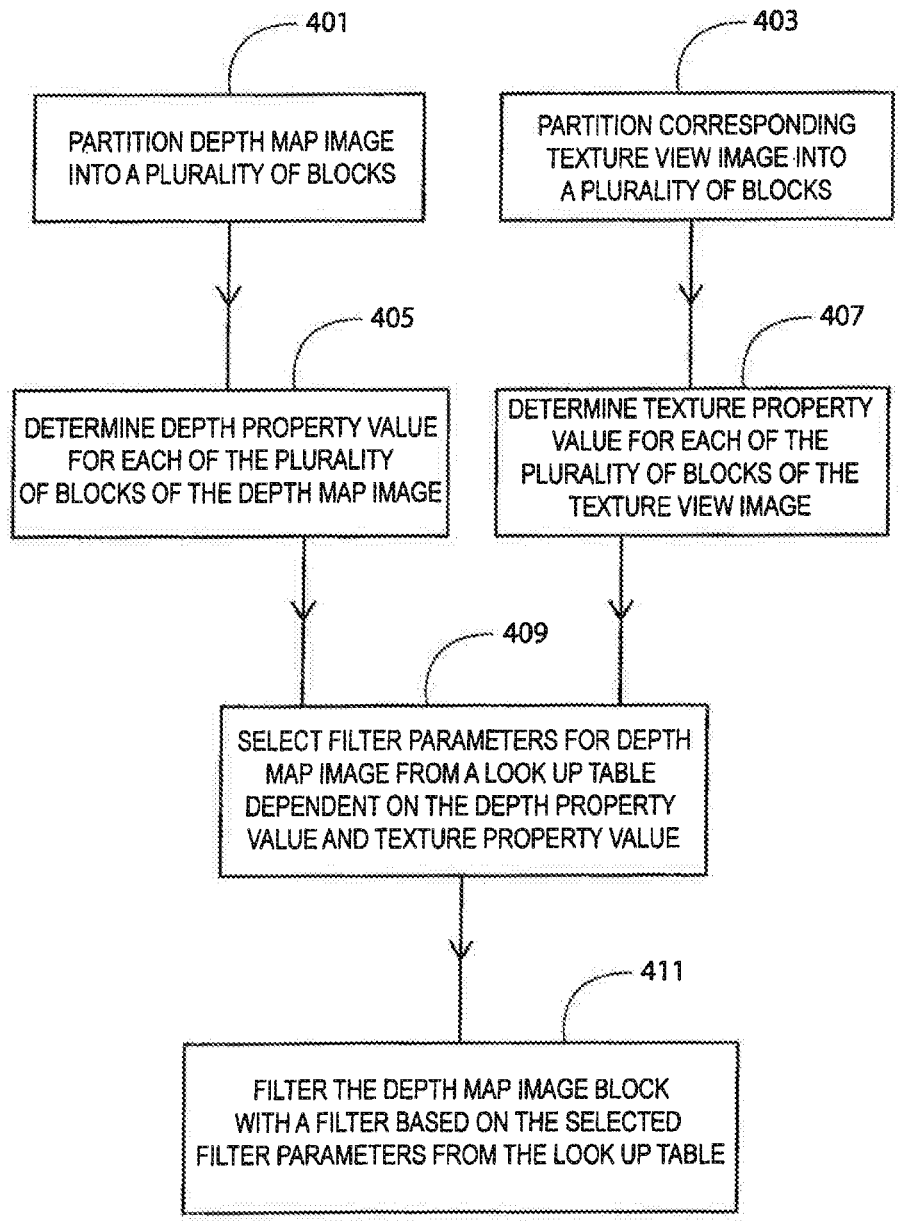
FIG. 4: shows a flow diagram illustrating the operation of filtering a depth map image according to some embodiments.

In this regard reference is made to FIG. 4 where there is shown a process for filtering a depth map in a block wise manner. A block from a depth map image can be filtered by taking into account the depth value of the block together with a texture characteristic from a corresponding block of a texture view image associated with the depth map image.

In some embodiments the depth map image may be partitioned into a plurality of blocks in which each block may cover a homogenous area of the image and thereby comprising pixels within a same depth interval. In other words the depth map image can be partitioned into blocks in an arbitrary manner in which the pattern of distribution of blocks is determined by the various homogeneous regions of the image. In such embodiments the size of the block may be dependent on the particular regions of the image. For instance if part of the depth map image comprises a large homogeneous region then the block size may be of larger dimension in order to encompass a larger area of pixels within the same depth interval. However if the block area encompasses a region of the depth map image which is not homogenous, in other words a region in which the depth value of the pixels changes to a different depth interval, then it may be advantageous in embodiments to use a smaller block size, thereby ensuring that the block encompasses as many pixels as possible within the same depth interval. One advantage of having different block sizes is to process similar pixels at once and hence, decreasing the number of operations per pixel. This may be attributed to the fact that blocks with similar depth values decrease the complexity of the following processing steps. However, to increase the accuracy for processing the edges in depth maps, it can be beneficial to process the spatial locations in the image introducing an edge in the depth map with more precision. This can be done via introducing smaller blocks covering the edges and separating them from blocks covering relatively larger homogenous areas. In such instances an edge detector may be used to identify the demarcation between differing depth intervals. An example of a suitable edge detector may be a Sobel filter of the form $$H_{Sobel} = \begin{bmatrix} -1 & 0 & 1 \\ -2 & 0 & 2 \\ -1 & 0 & 1 \end{bmatrix}$$

However, it is to be understood that in other embodiments other forms of edge detector existing in the prior art can be used instead.

Figure 5:
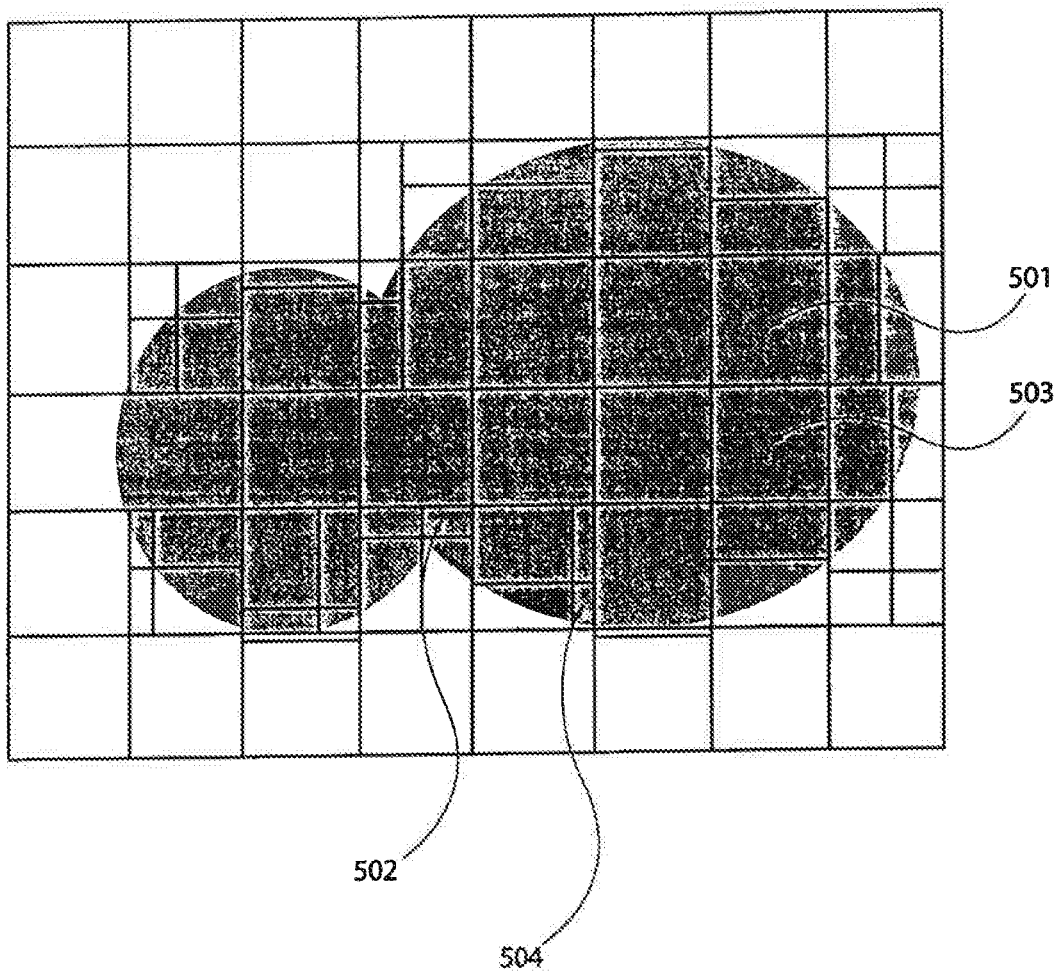
FIG. 5: shows schematically an example of partitioning the depth map image according to some embodiments.

With reference to FIG. 5, there is shown a simplified schematic depicting how a simplified depth map image may be portioned into blocks according to the above scheme. It can be seen from FIG. 5 that for homogeneous regions comprising pixels at the same depth interval, in other words regions in which the pixels are grey scale coded to the same level, a larger block size is used 501 and 503. Also depicted in FIG. 5 are regions of the depth map image in which an edge has been detected thereby demarking the transition between depth levels. In these instances a smaller block size, demonstratively shown in FIG. 5 as 502 and 504, is used to partition the transitional regions.

It is to be appreciated that this form of partitioning has the advantage of ensuring that any particular block comprises predominantly of pixels at the same grey scale value or in other words at the same depth.

It is to be understood that the depth map filtering process such as that outlined in FIG. 4 may be implemented as a preprocessing stage before the depth map image is encoded using a video encoder.

In other embodiments the size of the block may be determined by the size of the macroblock of the downstream video encoder. To this end the block size used to partition the depth map may be determined to be the same size as used in the following video encoder. For example, in embodiments in which the video encoder in use is of the type conforming to the International Telecommunications Union Standard H.264 or H.265, then the block size used within the depth map may be the same size as the macro block sizes for the H.264 or H.265 encoders respectively.

The step of partitioning the depth map image into a plurality of blocks is shown as processing step 401 in FIG. 4. It is to be appreciated that the step of partitioning the depth map into a plurality of blocks may be realized on the apparatus 300 by the processor 302 working cooperatively with the content of the memory 304 and optionally with other components described herein.

Once the depth map image has been divided into blocks or macroblocks the at least one texture view image may also be divided into corresponding blocks or macroblocks. In other words the texture view image may also be divided into blocks having the same division profile as the depth map image, such that there is a one to one mapping of blocks between the depth map image and the at least one texture view image.

The step of partitioning the at least one corresponding texture view image into the same pattern of blocks as that of the texture view image is shown as processing step 403 in FIG. 4. Furthermore it is to be appreciated that the step of partitioning the at least one corresponding texture view image into blocks may also be realized on the apparatus 300 by the processor 302 working cooperatively with the content of the memory 304 and optionally with other components described herein.

If the sampling grid between texture view image and depth map image differs, then, if required, different sampling grid alignment methods between a texture view component and a depth view component as presented in earlier can be considered.

In embodiments specific filter parameters (or criteria) may be used to filter at least one block of the depth map image. In particular the filter parameters (or criteria) may be specifically tailored towards a value which represents the depth property (or depth property value) of the at least one block in the depth map image and a value which represents the texture property (or texture property value) of the corresponding block from the at least one texture image view.

The depth property value of the at least one block of the depth map image may be returned by a function of the pixel depth values $f(D)$ within the at least one block of the depth map image. Similarly, the texture property value of the corresponding block from the at least one texture view image may be returned by a function of the pixel values ƒ(T) within the corresponding block.

It is to be understood in embodiments that the mathematical operation performed by the function ƒ(D) on the pixel depth values, need not be the same mathematical operation as performed by the function ƒ(T) on the pixel texture values In embodiments a look up table approach may be adopted to facilitate the allocation of filter parameters (or criteria) for filtering the various blocks of the depth map image. The particular filter parameters (or set of filter parameters) used to filter a block of the depth map image may be referenced in a look up table according to the function of the pixel depth value ƒ(D) (or depth property value) of the at least one block to be filtered and a function of the pixel values ƒ(T) (or texture property value) of the texture view block corresponding to the at least one block to be filtered.

Figure 6:
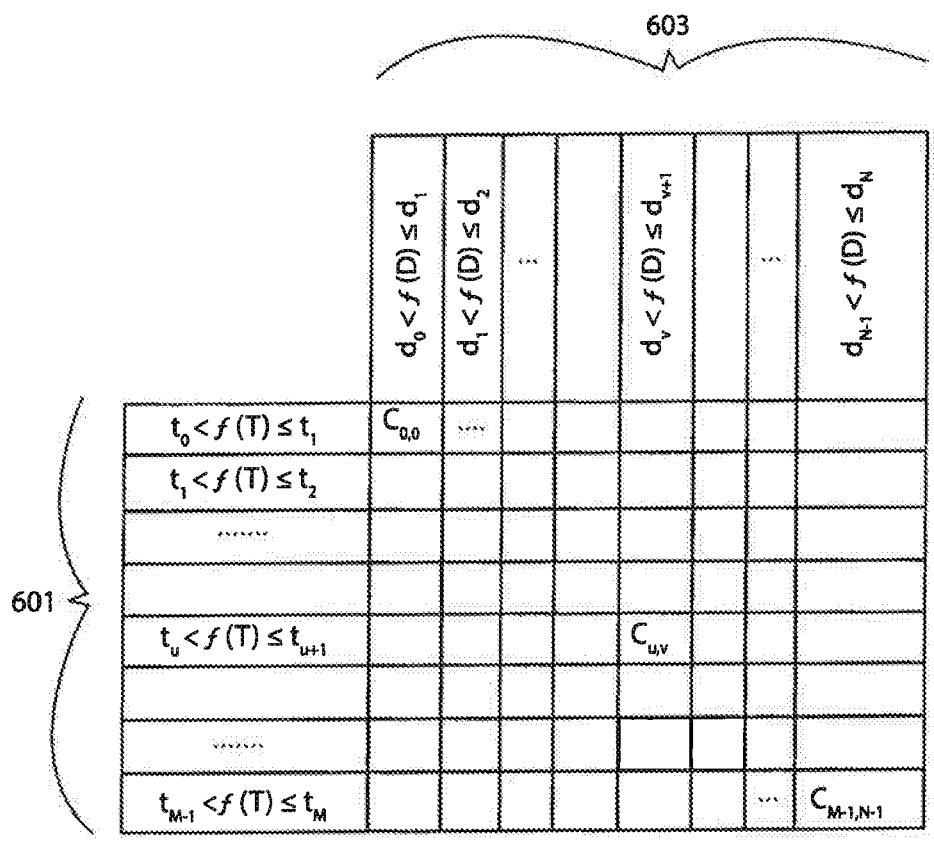
FIG. 6: shows schematically an example of a look up table for use in some embodiments.

With reference to FIG. 6, there is shown an example of a look up table for use in embodiments. The look up table may be structured such that along one dimension 601 there may be a function ƒ(T) of texture pixel values T which is divided into a number of intervals. Each interval may be arranged to span a range of values for the function ƒ(T). For example, FIG. 6 depicts ƒ(T) being divided into M individual intervals, with each interval spanning a range of the function ƒ(T) between texture property values $t_u$ and $t_{u+1}$.

The look up table may be further structured such that along another dimension 603 the function ƒ(D) of depth value may be pursued. Similarly, the function ƒ(D) may also be divided into a number of individual intervals, with each interval spanning a range of the function ƒ(D) between depth property values $d_v$ and $d_{v+1}$. FIG. 6 also depicts the function ƒ(D) being divided into N intervals.

With further reference to FIG. 6 each combination of an interval of $t_u < f(T) \leq t_{u+1}$ and an interval of $d_v < f(D) \leq d_{v+1}$ gives a set of filter parameters $C_{uv}$ for filtering a block of the depth map image, where u denotes the row of the look up table and v denotes the column of the look up table.

The texture function ƒ(T) may be representative of the texture property associated with a block of the depth map image, the texture property value being derived from a corresponding block from the at least one texture view as outlined above.

In embodiments texture property value may be derived based on the frequency domain characteristics of the corresponding block from the texture view image. For example, the texture property value as returned by the texture function ƒ(T) may be expressed in terms of the high frequency components (HFC) of the corresponding block in the texture view image.

The texture property value as returned by the texture function ƒ(T) maybe realized by transforming pixels from the corresponding block in the texture view image to the frequency domain for analysis. This may be performed by performing a discrete cosine transformation (DCT) on the corresponding block of pixels from the texture view image. The transformation for a block i with size m×n may be expressed as $dct\_values_i = abs(dct(block_{i,m \times n}))$. The components representing the HFCs for the block i will be predominantly located in the lower right corner of the DCT. The values may be retrieved as $dct\_values_i$ for the block i. For some embodiments the HFC of the block, and therefore the value returned by the texture function ƒ(T) may be taken as the average of the $dct\_values_i$ located in the lower quarter of the DCT block, which may be expressed as $$f(T) = \text{average}(abs(dct(block_{i,n \times n}))) \text{ for } n \in \left\{\frac{n}{2}, \frac{n}{2}+1, \ldots\ldots, n\right\}.$$

The presented algorithm to derive the amount of HFCs in a block is one embodiment and any other approach that represents the characteristics of the texture block can be considered too.

In embodiments the range of values for each interval of the function ƒ(T) may be calculated in an off line manner over a database comprising a number of depth map images and their corresponding texture view images. For example, values for ƒ(T) from all blocks of a plurality of texture view images may be collated in order to determine a minimum and maximum value of ƒ(T). The range between the minimum and maximum values for ƒ(T) may be divided into a number of separate intervals in accordance with the number of intervals along the ƒ(T) dimension of the look up table. For example, with reference to FIG. 6 the range of values obtained for ƒ(T) would be divided into M individual non overlapping intervals.

It is to be appreciated in some embodiments the intervals along the ƒ(T) dimension may be arranged such that any one interval may partially overlap with a neighbouring interval. However, in other embodiments the intervals along the ƒ(T) dimension may be arranged in a non-overlapping manner.

In embodiments the measure of depth property value as returned by the function ƒ(D) may be depended on at least one of the mean depth value of the pixels in the at least one block, the median depth value of the pixels in the at least one block, and the maximum depth value of the pixels in the at least one block of the depth map image.

In other embodiments the measure of depth property value as returned by the function ƒ(D) for a block from the depth map image may take the form of a histogram or relative frequency approach. For this approach the frequency of occurrence of pixel values within the at least one block of the depth map image can be used as the depth property value by the function ƒ(D) in which the most frequently occurring pixel value is returned, or in other words the pixel value associated with the tallest bin. For example, a histogram H(x) of the depth map may be generated such that the x-axis represents the sample depth values and the y-axis represents the number of pixels having the depth values represented on x-axis.

Other embodiments may return a depth property value based on the results of a face detection algorithm. In such embodiments the value returned by the function ƒ(D) may be indicative of whether a face has been detected within the at least one block of depth pixels. In these embodiments the function ƒ(D) may be further arranged to indicate the percentage fraction of the block in which the detected face occupies. Similar algorithms can be applied in function ƒ(T) to affect the texture property value.

In further embodiments the depth property value as returned by the function ƒ(D) may take the form of a combination of two or more individual depth property values described above. For example, the depth property value as returned by function ƒ(D) may be based on a combination of the mean depth value, median depth value, the relative frequency of the pixel depth values in the block, and the like.

As before the range of depth property values for each interval of the function ƒ(D) may be calculated in an off-line manner over a database comprising a number of depth map images. For example, values for ƒ(D) from all blocks of a plurality of depth map images may be collated in order to determine a minimum and maximum value returned by $f(D)$. The range between the minimum and maximum values returned by $f(D)$ may then be divided into a number of separate intervals in accordance with the number of intervals the $f(D)$ dimension of the look up table is required to be divided. For example, with reference to FIG. 6 the range of depth property values returned for $f(D)$ would be divided into N individual non overlapping intervals.

As before in some embodiments the intervals along the $f(D)$ dimension may also be arranged such that any one interval may partially overlap with a neighbouring interval. However, as before other embodiments the intervals along the $f(D)$ dimension may also be arranged in a non-overlapping manner.

Accordingly the look up table may be populated with different filter parameters (or criteria) according to the various depth property values and texture property values used to reference said look up table. Which in turn enables the selection of specific filter parameters according to the depth and texture property values of the block to be filtered in the depth map image.

During operation of the block based depth map filtering process the texture property value and depth property value, as returned from the respective functions $f(T)$ and $f(D)$, may be determined for the at least one block in the partitioned depth map image.

The steps of determining the depth and property values for at least one block of the depth map image are shown as processing step 405 and 407 respectively in FIG. 4. It is to be appreciated that the steps of determining the depth and property values for at least one block of the depth map image may be realized on the apparatus 300 by the processor 302 working cooperatively with the content of the memory 304 and optionally with other components described herein.

The texture property value and depth property value may then be used to identify, from the look up table, the appropriate filter parameters $C_{uv}$ for filtering the at least one depth block.

It is to be appreciated that the value returned from the texture function $f(T)$ (in other words the texture property value) identifies the texture function interval for the $f(T)$ dimension of the look up table. For example, with reference to FIG. 6, interval (or row) u of the look up table is selected when the texture value t as returned by the function $f(T)$ lies within the interval $t_u \le t \le t_{u+1}$. It is to be further appreciated that the value returned from the depth map function $f(D)$ identifies the depth function interval for the $f(D)$ dimension of the look up table. For example, and again with reference to FIG. 6, interval (or column) v of the look up table is selected when the depth value d as returned by the function $f(D)$ lies within the interval $d_v \le d \le d_{v+1}$. Consequently the interval u and interval v can be used to identify the filter parameters $C_{uv}$ for filtering the at least one block of the depth map image.

The step of selecting filter parameters from the look up table dependent on the specific depth and texture property values for the at least one depth map image block is shown as processing step 409 in FIG. 4. It is to be appreciated that step of selecting filter parameters dependent on the specific depth and texture property values for the at least one depth map image block may for example be realized on the apparatus 300 by the processor 302 working cooperatively with the content of the memory 304 and optionally with other components described herein.

As stated above the apparatus 300 may be caused to apply selective filtering to the at least one block of the depth map image based on the selected filter parameters denoted by $C_{uv}$.

In embodiments the selective filtering applied to the at least one block of the depth map image may take the form of manipulating the filter strength in accordance with the depth property value of the at least one block and the texture property value associated with the at least one block. Therefore as stated previously the look up table may be populated with filter parameters $C_{uv}$ which takes into account the balance between the magnitude/or count of HFCs associated within the at least one depth map block and the depth property value of the at least one block in the depth map image.

In general the filter parameters $C_{uv}$ are generated based on having an increased filter strength when the depth property value is high. In other words depth map image blocks which have been determined to be further away from the camera can be filtered with filter parameters with a higher strength. This may result in the removal of more detail from the depth map image blocks, than other depth map image blocks which are deemed to be closer to the camera and therefore have a lower depth property value.

In embodiments the generation of the filter parameters can be tuned based on the amount of HFCs (or details) in the respective texture block such that the lower the amount of HFCs in the respective texture block, then stronger the filter parameters $C_{uv}$. Therefore the amount of HFCs in the corresponding texture image block can determine the calculated texture property value which in turn can affect the value of the filter parameters $C_{uv}$.

However, it is to be appreciated that the effect of stronger filtering in accordance with the depth property value of the depth map block may be counter balanced by the associated texture property value of the depth map block. In other words the increasing strength of filtering with increasing depth property values may be regulated to some degree by the HFC count (or texture property value) associated with the depth map block. Such that any depth map blocks which may have a larger depth property value and higher associated HFC count will not be filtered as strongly as depth filter blocks with the same depth property value but lower associated HFC count (or texture property value).

In general the look up table may be populated with filter parameters $C_{uv}$ which exhibit increasing filter strength with increasing depth property values, but the degree as to which the strength increases can be regulated by the associated texture property value (in this instance HFC count).

The at least one depth map block may then be filtered with the selected filter parameters $C_{uv}$ as provided by the look up table. In embodiments the filtering may take the form of applying a low pass filter to the block. For example a Gaussian low pass filter may be used for such a purpose which may be defined by the parameters size and standard deviation. Therefore in such an example the filter parameters $C_{uv}$ entry in the look up table may comprise a size value and standard deviation value which are dependent on the respective depth interval value and texture interval value to which the particular filter parameters $C_{uv}$ map. In the above example, the size parameter may refer to the size of the square matrix representing the Gaussian low pass filter.

In other embodiments, a bilateral filter may be used to filter the at least one depth map block in which depth edges or discontinuities may be preserved.

In embodiments the generation of the filter parameters $C_{uv}$ for each entry into the look up table may be done manually.

The step of filtering the at least one depth map image block with a filter based on filter parameters selected from the look up table is shown as processing step 411 in FIG. 4. It is to be appreciated that the step of filtering the at least one depth map image block with a filter based on filter parameters selected from the look up table may for example be realized on the apparatus 300 by the processor 302 working cooperatively with the content of the memory 304 and optionally with other components described herein.

It is to be appreciated in embodiments the process may be performed for any number of the partitioned depth map image blocks. For instance the above process may be performed for each of the depth map image blocks which comprise the partitioned depth map image. Alternatively the above process may be performed for a sub set of the depth map image blocks.

In embodiments the above selection process for filter parameters has the advantage of preserving the quality of the foreground objects in a 3 dimensional image whilst removing detail from the background portions which are typically associated with less perceptually important regions of the image. Therefore when the block based depth map filtering process is considered in place as a preprocessing stage for a multiview video encoder there may be a further advantage of lowering the coding rate associated with the media content without sacrificing overall subjective, since the reduction in the less important background detail will result in less coding bits to represent such regions of the image.

In an example embodiment, the selective filtering applied to the distinct depth map image blocks facilies in lowering the coding bitrate associated with the media content without sacrificing the subjective visual quality. For example, while accessing 3D media content, the quality of objects closer to the viewer are desired to be associated with higher quality as compared to the objects away from the viewer. In this regard, various embodiments of the disclosure facilitates in preserving the quality of the foreground portions of the 3D media content while removing certain details in the background portions.

As already discussed with reference to FIG. 1b, the multi-view video data includes both texture information as well as depth information. The texture information may describe luminance (brightness or intensity) and chrominance (color, e.g., blue hues and red hues) of the media content, for example, an image. In an example embodiment, the texture information may include measure of one or more texture properties, for example HFCs associated with the texture layers. Depth information represented by a depth map may include individual pixels that may be assigned depth values indicative of position/location of said pictures at which the pixels may be displayed. For example, the depth information may provide information of the depth from a reference location of a pixel at which corresponding pixels of the texture view/image may be displayed on a stereoscopic or autostereoscopic display in such a manner that they appear at the screen level, relatively in front of the screen, or relatively behind the screen.

Figure 7:
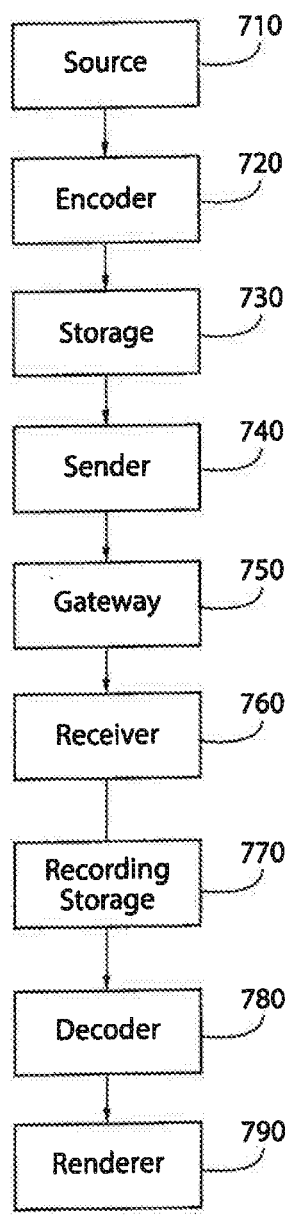
FIG. 7: shows a flow diagram representation of an example multimedia communication system according to some embodiments.

FIG. 7 is a graphical representation of an example multimedia communication system within which various embodiments may be implemented. A data source 710 provides a source signal in an analog, uncompressed digital, or compressed digital format, or any combination of these formats. An encoder 720 may include or be connected with a pre-processing, such as data format conversion and/or filtering of the source signal. The encoder 720 encodes the source signal into a coded media bitstream. It should be noted that a bitstream to be decoded may be received directly or indirectly from a remote device located within virtually any type of network. Additionally, the bitstream may be received from local hardware or software. The encoder 720 may be capable of encoding more than one media type, such as audio and video, or more than one encoder 720 may be required to code different media types of the source signal. The encoder 720 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 7 only one encoder 720 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 730. The storage 730 may comprise any type of mass memory to store the coded media bitstream. The format of the coded media bitstream in the storage 730 may be an elementary self-contained bitstream format, or one or more coded media bitstreams may be encapsulated into a container file. If one or more media bitstreams are encapsulated in a container file, a file generator (not shown in the figure) may be used to store the one more media bitstreams in the file and create file format metadata, which may also be stored in the file. The encoder 720 or the storage 730 may comprise the file generator, or the file generator is operationally attached to either the encoder 720 or the storage 730. Some systems operate "live", i.e. omit storage and transfer coded media bitstream from the encoder 720 directly to the sender 740. The coded media bitstream may then be transferred to the sender 740, also referred to as the server, on a need basis. The format used in the transmission may be an elementary self-contained bitstream format, a packet stream format, or one or more coded media bitstreams may be encapsulated into a container file. The encoder 720, the storage 730, and the server 740 may reside in the same physical device or they may be included in separate devices. The encoder 720 and server 740 may operate with live real-time content, in which case the coded media bitstream is typically not stored permanently, but rather buffered for small periods of time in the content encoder 720 and/or in the server 740 to smooth out variations in processing delay, transfer delay, and coded media bitrate.

The server 740 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 740 encapsulates the coded media bitstream into packets. For example, when RTP is used, the server 740 encapsulates the coded media bitstream into RTP packets according to an RTP payload format. Typically, each media type has a dedicated RTP payload format. It should be again noted that a system may contain more than one server 740, but for the sake of simplicity, the following description only considers one server 740.

If the media content is encapsulated in a container file for the storage 730 or for inputting the data to the sender 740, the sender 740 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The server 740 may or may not be connected to a gateway 750 through a communication network. It is noted that the system may generally comprise any number gateways or alike, but for the sake of simplicity, the following description only considers one gateway 750. The gateway 750 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 750 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes or other devices that forward broadcast transmissions locally to home wireless networks. When RTP is used, the gateway 750 may be called an RTP mixer or an RTP translator and may act as an endpoint of an RTP connection.

The system includes one or more receivers 760, typically capable of receiving, de-modulating, and de-capsulating the transmitted signal into a coded media bitstream. The coded media bitstream may be transferred to a recording storage 770. The recording storage 770 may comprise any type of mass memory to store the coded media bitstream. The recording storage 770 may alternatively or additively comprise computation memory, such as random access memory. The format of the coded media bitstream in the recording storage 770 may be an elementary self-contained bitstream format, or one or more coded media bitstreams may be encapsulated into a container file. If there are multiple coded media bitstreams, such as an audio stream and a video stream, associated with each other, a container file is typically used and the receiver 760 comprises or is attached to a container file generator producing a container file from input streams. Some systems operate "live," i.e. omit the recording storage 770 and transfer coded media bitstream from the receiver 760 directly to a decoder 780. In some systems, only the most recent part of the recorded stream, e.g., the most recent 10-minute excerption of the recorded stream, is maintained in the recording storage 770, while any earlier recorded data is discarded from the recording storage 770.

The coded media bitstream may be transferred from the recording storage 770 to the decoder 780. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 770 or the decoder 780 may comprise the file parser, or the file parser is attached to either recording storage 770 or the decoder 780. It should also be noted that the system may include many decoders, but here only one decoder 780 is discussed to simplify the description without a lack of generality The coded media bitstream may be processed further by a decoder 780, whose output is one or more uncompressed media streams. Finally, a renderer 790 may reproduce the uncompressed media streams with a loudspeaker or a display, for example. The receiver 760, recording storage 770, decoder 780, and renderer 790 may reside in the same physical device or they may be included in separate devices.

The sender 740 according to various embodiments may be configured to select the transmitted layers of a scalable video bitstream for multiple reasons, such as to respond to requests of the receiver 760 or prevailing conditions of the network over which the bitstream is conveyed. A request from the receiver 760 can be, e.g., a request for a change of transmitted scalability layers or a change of a rendering device having different capabilities compared to the previous one.

The receiver 760 may comprise a proximity detector or may be able to receive signals from a separate proximity detector to determine the distance of the viewer from the display and/or the position of the head of the viewer. On the basis of this distance determination the receiver 760 may instruct the decoder 780 to change the number of scalable layers representing different filtering levels. For example, only the base layer may be requested to be transmitted, if a viewer is relatively far away from the display and hence unlikely to be able to see and/or unlikely to pay attention to details on texture view layers corresponding to background depth layers.

In some embodiments, the receiver 760 may communicate with the encoder 720 to inform the encoder 720 that filtering can be adapted based on the distance of the viewer from the display. Such communication may take place for example when encoding is taking place in real-time e.g. in a video telephone or conferencing connection.

In one example embodiment the proximity detector is implemented by using a front-facing camera of the receiving device and analyzing the image signal from the camera to determine the distance and/or the head position of the viewer.

Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 300. However, the operations of the methods can be described and/or practiced by using any other apparatus.

It is to be understood that while various embodiments have been described with reference to video content, embodiments could similarly be realized with other types of visual content, such as still images, image bursts or image sequences, and/or animations.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 2 and/or 3. A computer-readable medium may comprise a non-transitory computer-readable storage medium that may be any media or means that can contain or store the instructions for use by or in connection with an instruction execution system, apparatus, or device, such as a computer.

Although various aspects of the embodiments are set out in the independent claims, other aspects comprise other combinations of features from the described embodiments and/or the dependent claims with the features of the independent claims, and not solely the combinations explicitly set out in the claims.

The invention claimed is:

1. A method comprising:
   partitioning a depth map image into at least one block;
   partitioning a texture image into at least one block, wherein a size and a position of the at least one block of the texture image corresponds to the size and the position of the at least one block of the depth image;
   determining a depth property value for the at least one block of the depth map image;
   determining a texture property value for the at least one block of the texture image;
   for each of the plurality of blocks, using the depth property value for the at least one block of the depth map image and the texture property value for the at least one block of the texture image to select a set of filter parameters from a look up table; and
   filtering the at least one block of the depth map image with a filter based on the selected set of filter parameters, wherein
   the texture property value comprises a value returned from a function of pixel texture values of the block of the texture image and the depth property value comprises a value returned from a function of pixel depth values of the block of the depth map image,
   the function of pixel depth values of the block of the depth map image comprises an output from a face detection algorithm for the pixel depth values of the block of the depth map image, and
   the output from the face detection algorithm is indicative of whether a face has been detected within the block and of a percentage fraction which the detected face occupies in the block.

2. The method as claimed in claim 1, wherein the look up table comprises a first dimension of a plurality of intervals of the depth property value and a second dimension of a plurality of intervals of the texture property value, and each combination of an interval of the plurality of intervals of the depth property value and an interval of the plurality of intervals of the texture property value references a distinct set of filter parameters in the look up table.

3. The method as claimed in claim 2, wherein the filter strength for filtering the at least one block of the depth map image is determined by the selected set of filter parameters, and wherein each of the distinct sets of filter parameters in the look up table have been tuned according to their respective interval of depth property value and their respective interval of texture property value.

4. The method as claimed in claim 2, wherein each of the plurality of intervals of the depth property value spans a different range of depth property values, wherein each of the plurality of intervals of the texture property value spans a different range of texture property values, and wherein using the depth property value and texture property value to select a set of filter parameters from a look up table comprises:
   determining an interval of the plurality of intervals of the depth property value with which the depth property value for the at least one block of the depth map image lies;
   determining an interval of the plurality of intervals of the texture property value with which the texture property value for the at least one block of the texture image lies; and
   selecting the set of filter parameters referenced by the determined interval of the plurality of intervals of the depth property value and the determined interval of the plurality of intervals of the texture property value.

5. The method as claimed in claim 1, wherein the function of pixel depth values is at least one of:
   mean of the pixel depth values of the at least one block of the depth map image;
   median of the pixel depth values of the at least one block of the depth map image; and
   histogram based value of the pixel depth values of the at least one block of the depth map image.

6. The method as claimed in claim 1, wherein the function of pixel depth values is the output from the face detection algorithm for the pixel depth values of the block of the depth map image combined with any of:
   mean of the pixel depth values of the at least one block of the depth map image;
   median of the pixel depth values of the at least one block of the depth map image; and
   histogram based value of the pixel depth values of the at least one block of the depth map image.

7. The method as claimed in claim 1, wherein the function of pixel texture values is based on the frequency domain characteristics of the pixel texture values of the at least on block of the texture image.

8. An apparatus comprising at least one processor and at least one memory including computer code, the at least one memory and the computer code configured to with the at least one processor cause the apparatus to:
- partition a depth map image into at least one block;
- partition a texture image into at least one block, wherein a size and a position of the at least one block of the texture image corresponds to the size and the position of the at least one block of the depth image;
- determine a depth property value for the at least one block of the depth map image;
- determine a texture property value for the at least one block of the texture image;
- use the depth property value for the at least one block of the depth map image and the texture property value for the at least one block of the texture image to select a set of filter parameters from a look up table; and
- filter the at least one block of the depth map image with a filter based on the selected set of filter parameters, wherein
- the texture property value comprises a value returned from a function of pixel texture values of the block of the texture image and the depth property value comprises a value returned from a function of pixel depth values of the block of the depth map image,
- the function of pixel depth values of the block of the depth map image comprises an output from a face detection algorithm for the pixel depth values of the block of the depth map image,
- and the output from the face detection algorithm is indicative of whether a face has been detected within the block and of a percentage fraction which the detected face occupies in the block.

9. The apparatus as claimed in claim 8, wherein the look up table comprises a first dimension of a plurality of intervals of the depth property value and a second dimension of a plurality of intervals of the texture property value, and each combination of an interval of the plurality of intervals of the depth property value and an interval of the plurality of intervals of the texture property value references a distinct set of filter parameters.

10. The apparatus as claimed in claim 9, wherein the filter strength for filtering the at least one block of the depth map image is determined by the selected set of filter parameters, and wherein each of the distinct sets of filter parameters in the look up table have been tuned according to their respective interval of depth property value and their respective interval of texture property value.

11. The apparatus as claimed in claim 9, wherein each of the plurality of intervals of the depth property value spans a different range of depth property values, wherein each of the plurality of intervals of the texture property value spans a different range of texture property values, and wherein the apparatus caused to use the depth property value and texture property value to select a set of filter parameters from a look up table is further caused to:
- determine an interval of the plurality of intervals of the depth property value with which the depth property value for the at least one block of the depth map image lies;
- determine an interval of the plurality of intervals of the texture property value with which the texture property value for the at least one block of the texture image lies; and
- select the set of filter parameters referenced by the determined interval of the plurality of intervals of the depth property value and the determined interval of the plurality of intervals of the texture property value.

12. The apparatus as claimed in claim 8, wherein the function of pixel depth values additionally comprises at least one of:
- mean of the pixel depth values of the at least one block of the depth map image;
- median of the pixel depth values of the at least one block of the depth map image; and
- histogram based value of the pixel depth values of the at least one block of the depth map image.

13. The apparatus as claimed in claim 8, wherein the function of pixel depth values is the output from the face detection algorithm for the pixel depth values of the block of the depth map image combined with any of:
- mean of the pixel depth values of the at least one block of the depth map image;
- median of the pixel depth values of the at least one block of the depth map image; and
- histogram based value of the pixel depth values of the at least one block of the depth map image.

14. The apparatus as claimed in claim 8, wherein the function of pixel texture values is based on the frequency domain characteristics of the pixel texture values of the at least on block of the texture image.

15. A non-transitory computer-readable storage medium having stored thereon computer-readable code, which, when executed by a computing apparatus, causes the computing apparatus to:
- partition a depth map image into at least one block;
- partition a texture image into at least one block, wherein a size and a position of the at least one block of the texture image corresponds to the size and the position of the at least one block of the depth image;
- determine a depth property value for the at least one block of the depth map image;
- determine a texture property value for the at least one block of the texture image;
- use the depth property value for the at least one block of the depth map image and the texture property value for the at least one block of the texture image to select a set of filter parameters from a look up table; and
- filter the at least one block of the depth map image with a filter based on the selected set of filter parameters, wherein
- the texture property value comprises a value returned from a function of pixel texture values of the block of the texture image and the depth property value comprises a value returned from a function of pixel depth values of the block of the depth map image,
- the function of pixel depth values of the block of the depth map image comprises an output from a face detection algorithm for the pixel depth values of the block of the depth map image,
- and the output from the face detection algorithm is indicative of whether a face has been detected within the block and of a percentage fraction which the detected face occupies in the block.

16. The non-transitory computer-readable storage medium of claim 15, wherein the look up table comprises a first dimension of a plurality of intervals of the depth property value and a second dimension of a plurality of intervals of the texture property value, and each combination of an interval of the plurality of intervals of the depth property value and an interval of the plurality of intervals of the texture property value references a distinct set of filter parameters.

17. The non-transitory computer-readable storage medium of claim 15, wherein the filter strength for filtering the at least one block of the depth map image is determined by the selected set of filter parameters, and wherein each of the distinct sets of filter parameters in the look up table have been tuned according to their respective interval of depth property value and their respective interval of texture property value.

\* \* \* \* \*